United States Patent [19]

Sandstrom

[11] 4,111,224
[45] Sep. 5, 1978

[54] WATER DISTRIBUTION SYSTEM

[76] Inventor: Wayne Sandstrom, Box 2414, Fairbanks, Ak. 99707

[21] Appl. No.: 681,619

[22] Filed: Apr. 29, 1976

[51] Int. Cl.² .................................................. F16L 55/04
[52] U.S. Cl. .................................... 137/207; 137/208; 137/357
[58] Field of Search ............... 137/207, 357, 362, 208, 137/206; 52/168, 173, 220

[56] References Cited

U.S. PATENT DOCUMENTS

| 256,291 | 4/1882 | Coggin | 137/206 |
| 357,128 | 2/1887 | Loretz | 137/206 X |
| 407,830 | 7/1889 | Loretz | 137/207 X |
| 581,330 | 4/1897 | Brady | 137/357 X |
| 3,148,745 | 9/1954 | Jones | 137/207 X |
| 3,410,302 | 11/1968 | Frick | 137/312 |

FOREIGN PATENT DOCUMENTS

| 931,484 | 10/1947 | France | 137/357 |
| 310,459 | 8/1933 | Italy | 137/357 |
| 8,187 | 5/1890 | United Kingdom | 137/357 |

Primary Examiner—Irwin C. Cohen
Attorney, Agent, or Firm—Bacon & Thomas

[57] ABSTRACT

A multi-level building has a water supply pipe extending upwardly through all levels. A closed chamber at each level receives water from the supply pipe at a position below the top of the chamber to trap and pressurize air therein. A plurality of distribution pipes extend from at least one end of each chamber to points of use at that level of the building. In one form the water pipe extends vertically through the chamber and in another form the chamber and water pipe are separate.

4 Claims, 8 Drawing Figures

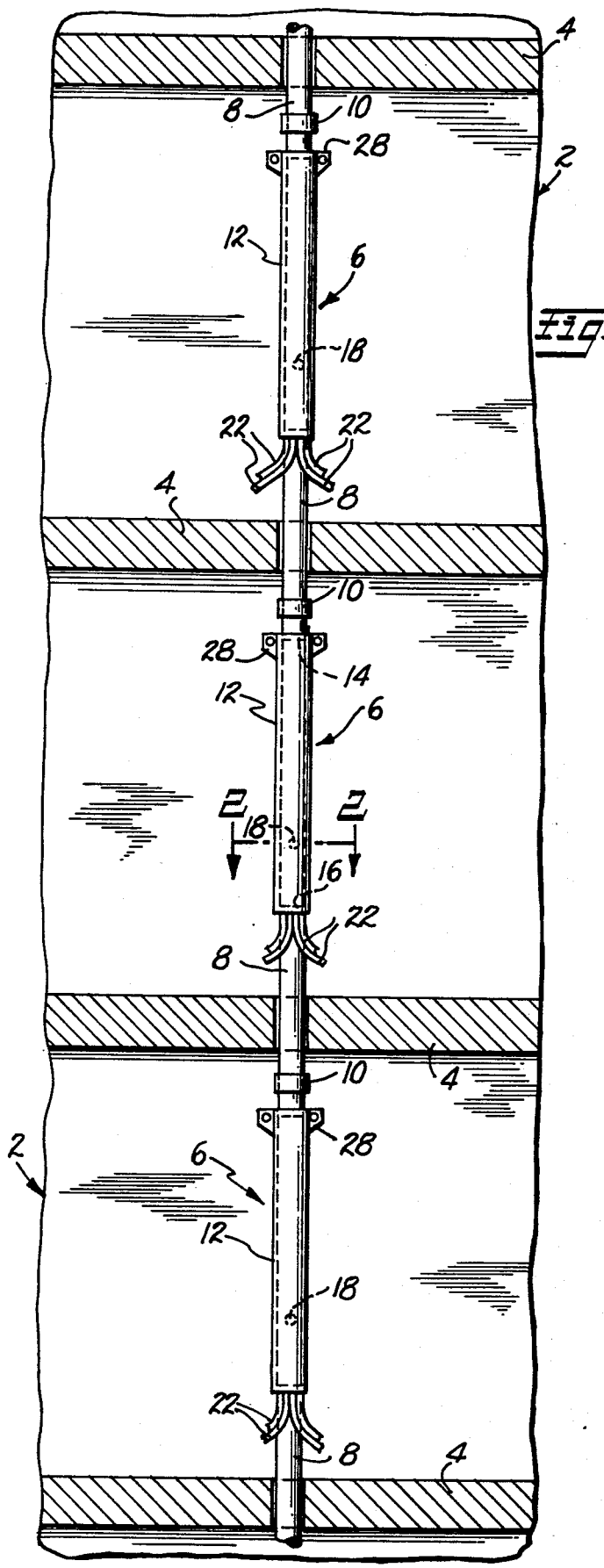
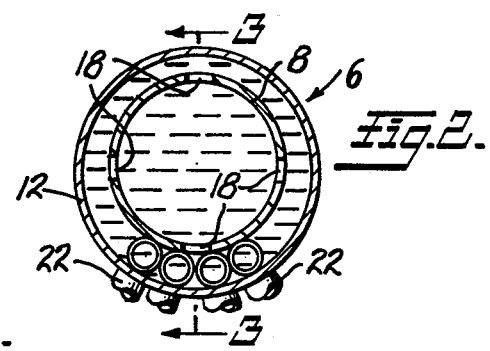
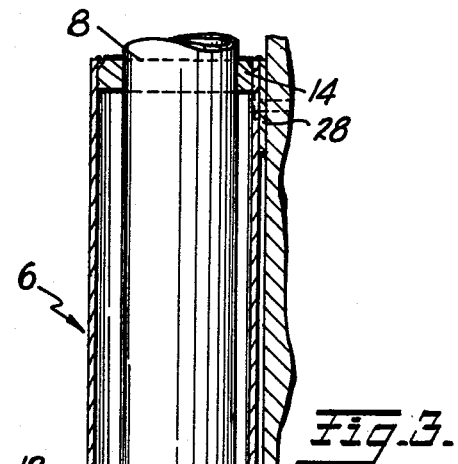
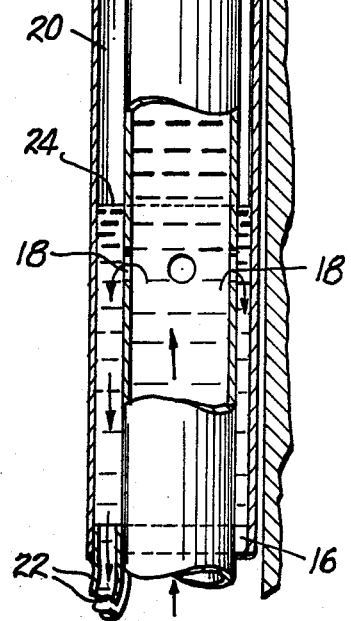

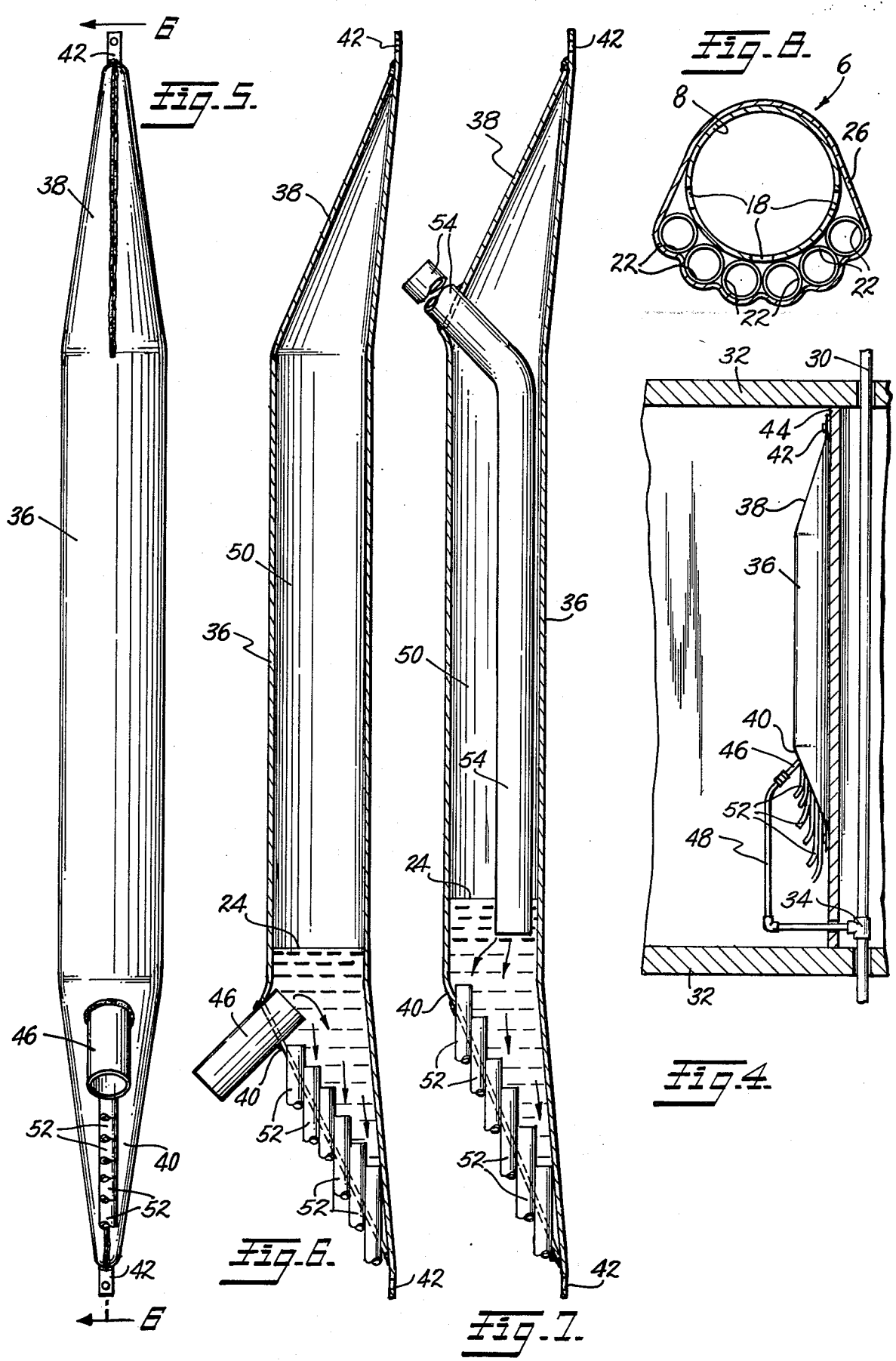

WATER DISTRIBUTION SYSTEM

BACKGROUND OF THE INVENTION

This invention is in the field of water distribution systems and particularly a system for distributing water in a multi-storied building.

It has heretofore been proposed to provide water distribution systems in multi-storied buildings including means defining an air chamber adapted to be placed under pressure by the water supply and multiple distribution conduits whereby the pressure of the air would tend to reduce surges in water pressure in the event of simultaneous use of several distribution conduits. Such prior devices are exemplified by the U.S. Pat. No. to Cantwell 648,847 and the U.S. Pat. No. to Fraick 3,410,302. The devices of those patents are of complicated construction and bulky and provision must be made for their accommodation within the confines of the building. There is a need for a water distribution system that can be installed in a building of conventional wall dimensions and of economical construction.

SUMMARY OF THE INVENTION

The present invention provides a multiplicity of water distribution chambers having means in each for entrapping air and wherein the chambers are adapted to be installed at each floor or level of the building and readily interconnected for supply by a single water main.

It is, therefore, an object of this invention to provide a water distribution system constituting an improvement of those heretofore proposed and being of simple and economical construction.

BRIEF DESCRIPTION OF THE DRAWINGS

FIG. 1 is a schematic view through a portion of a multi-storied building having units of the present invention installed therein;

FIG. 2 is a horizontal sectional view taken substantially on the line 2—2 of FIG. 1;

FIG. 3 is a vertical sectional view taken along the line 3—3 of FIG. 2;

FIG. 4 is a schematic view of a modified form of the invention;

FIG. 5 is an enlarged front view of the chamber shown in FIG. 4;

FIG. 6 is a vertical sectional view taken along the line 6—6 of FIG. 5;

FIG. 7 is a view similar to FIG. 6 but showing a further modified form of the invention; and FIG. 8 is a sectional view similar to FIG. 2 but showing another modified form of the invention.

DESCRIPTION OF THE PREFERRED EMBODIMENTS

Referring first to FIG. 1, there is shown therein, in schematic form, a portion of a multi-storied building 2 having vertically spaced "floors" 4 defining separate stories of the building. The water distribution system depicted in FIG. 1 comprises a plurality of substantially identical distribution units 6, there being one at each level of the building. Each unit 6 includes a supply conduit 8 of sufficient length to be joined to corresponding units at the adjacent building levels. Such connection may be accomplished by any suitable coupling, generally indicated at 10. FIGS. 2 and 3 show a typical distribution unit 6 in greater detail. As shown, the supply conduit 8 is a continuous pipe extending between coupling members 10 and is surrounded by a jacket 12 spaced therefrom. It is to be noted that the supply conduit 8 may be a 1⅜ inch pipe whereas the jacket 12 may be of a diameter of the order of 2 inches. Thus, the entire device is of minimal dimensions and may easily be housed within the confines of the building walls without special provision therefor.

The jacket 12 is sealingly joined to the conduit 8 at the opposite ends of the jacket by any suitable sealing rings 14 and 16 which may be welded, soldered or otherwise sealed to the ends of the jacket 12 and the conduit 8 to define a sealed chamber therebetween. Openings 18 are formed in the conduit 8 within the chamber defined by jacket 12 and a substantial distance below the top of that jacket. Thus, water under supply pressure in the conduit 8 can flow through the openings 18 into the chamber 20 but since the body of air above the openings 18 is trapped in that chamber, the pressure of the water in conduit 8 will compress the trapped air until the pressure thereof is equal to that of the water. The lower sealing ring 16 is further provided with openings through which distribution conduits 22 extend, in sealed relation to the link 16. Any desired number of such conduits may be provided and it is contemplated that each conduit 22 be in the form of a bendable length of tubing that may be connected in any known or suitable manner to further conduits for conducting water to a remote location on its respective floor. Preferably there are about the same number of openings 18 as there are distribution conduits 22, totalling approximately the same area. Clearly, the distribution device described may be employed for either hot or cold water.

As shown in FIG. 2, the jacket 12 is somewhat eccentric to the conduit 8. In the form shown, that eccentricity is provided to provide sufficient radial space at one side of the device for the distribution conduits 22. However, the jacket may be made of any acceptable diameter and in some cases it may not be necessary to arrange it in eccentric relation to conduit 8.

While not shown herein, it is contemplated that distribution conduits like 22 may extend through the upper sealing ring 14. In such case, the conduits will necessarily extend downwardly in the chamber 20 to a level below the surface 24 of the water in that chamber to thus ensure entrappment of the air in the upper portion of the chamber while providing an inlet to the distribution conduit within the body of water in the chamber.

FIG. 8 illustrates a further modified form which may be similar to that shown in FIGS. 1 to 3 but wherein a jacket 26 is provided around conduit 8 in intimate surface contact with the conduit throughout substantially half of its circumference and then embracing a multiplicity of distribution conduits 22 on the other side of conduit 8. This form of the invention may be resorted to when the available space is minimal or when larger than usual conduits are employed.

As also shown in FIG. 1, each of the jackets 12 may be provided with suitable bracket means 28 whereby the distribution device may be secured to an upstanding wall or other portion of the building structure.

Referring now to FIGS. 4, 5 and 6, FIG. 4 schematically illustrates a modified form of the invention wherein a continuous supply conduit or water main 30 extends through successive floors 32 of a building and is provided with a fitting 34 at each level of the building. In this form of the invention, a tubular member 36 defines a closed chamber and may be constructed with its ends 38 and 40 tapered as shown for ease of construction and/or economy of space. The extreme ends of the tubular member may be configured to define brackets 42 by which the chamber may be secured to a supporting wall or other building structure 44. As shown in FIGS. 5 and 6, a water supply conduit 46 extends sealingly through the lower end 40 of member 46 to supply water thereto. The conduit 46 may be joined to the fitting 34 previously referred to by any suitable pipe, tubing or the like 48. It will be apparent that water delivered into chamber 50 or member 36 will trap a body of air thereabove and compress the same as previously described with reference to the earlier modification.

A plurality of distribution tubes 52 extend through the lower end 40 into chamber 50 and these likewise may be in the form of short lengths of bendable tubing adapted to be connected to any desired point of use on the appropriate level of the building.

FIG. 7 illustrates a further modified form of the invention similar to that of FIGS. 5 and 6 but wherein the water supply conduit 54 extends sealingly through the upper end 38 of member 36 and extends downwardly in chamber 50 to a position adjacent the lower end thereof so as to trap a body of air within the chamber as already described. Like reference numerals in FIG. 7 indicate elements similar to or identical with those of FIG. 6.

In both the embodiments of FIGS. 5 and 7, it is again contemplated that distribution conduits may enter the respective chambers from the top thereof in which case they must extend downwardly to a level below the surface of the water in that chamber.

It will be apparent that the described devices provide means, of a single convenient size, for installation in the required number for buildings of any size and will be effective to provide constant pressure at the points of use irrespective of momentary demand. Also, the plurality of air chambers functions as an effective sound insulation of dampening means preventing undue transmission of running-water sounds along the supply pipe.

While a limited number of specific examples have been shown and described herein, the same are merely illustrative of the principles involved and other modified forms may be resorted to within the scope of the appended claims.

I claim:

1. A water distribution system for a multi-storied building, comprising:
   a continuous water supply conduit extending upwardly through said building;
   means defining an upstanding closed chamber at each of said stories;
   means for directing water from said supply conduit into each of said chambers at a level substantially below the top thereof whereby a body of air is trapped in the upper part of said chamber;
   a plurality of water distribution conduits extending from one end of each of said chambers for supplying water therefrom to each of a plurality of locations at each of said stories, each of said distribution conduits communicating with said chamber below said level; and
   said means defining each of said chambers comprising a jacket member surrounding a portion of said continuous supply conduit and sealed thereto at upper and lower ends, the annular space between said supply conduit and jacket defining said chamber, said means for directing water into said chamber comprising at least one opening in the side of said supply conduit at said level in said chamber.

2. A water distribution system as defined in claim 1 wherein said supply conduit comprises a separate conduit section for each story of said building, said sections being serially joined to define said supply conduit and each of said jackets being permanently joined to its corresponding conduit section.

3. A water distribution unit comprising:
   a continuous water supply conduit;
   means defining an upstanding closed chamber adjacent said conduit;
   means for directing water from said supply conduit into said chamber at a level substantially below the top thereof whereby a body of air is trapped in the upper part of said chamber;
   a plurality of water distribution conduits extending from one end of said chamber for supplying water therefrom to each of a plurality of locations, each of said distribution conduits communicating with said chamber below said level; and
   said means defining said chamber comprising a jacket member surrounding a portion of said supply conduit and sealed thereto at upper and lower ends, the annular space between said supply conduit and jacket defining said chamber, said means for directing water into said chamber comprising at least one opening in the side of said supply conduit at said level in said chamber.

4. A water distribution unit as defined in claim 3 wherein said supply conduit comprises a conduit section of predetermined length adapted to be serially joined to the conduit sections of similar units and said jacket being permanently joined to its conduit section.

* * * * *